United States Patent
Henson

(10) Patent No.: US 9,198,346 B2
(45) Date of Patent: *Dec. 1, 2015

(54) CONTROL SYSTEM FOR STARTING ELECTRICALLY POWERED IMPLEMENTS

(71) Applicant: DEERE & COMPANY, Moline, IL (US)

(72) Inventor: Robert A. Henson, Apex, NC (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/250,420

(22) Filed: Apr. 11, 2014

(65) Prior Publication Data

US 2014/0216830 A1  Aug. 7, 2014

Related U.S. Application Data

(63) Continuation of application No. 12/039,328, filed on Feb. 28, 2008, now Pat. No. 8,738,237.

(51) Int. Cl.
| | |
|---|---|
| *A01D 34/00* | (2006.01) |
| *A01D 34/58* | (2006.01) |
| *A01D 69/02* | (2006.01) |
| *H02P 1/04* | (2006.01) |
| *H02P 1/58* | (2006.01) |

(52) U.S. Cl.
CPC ............. *A01D 34/006* (2013.01); *A01D 34/58* (2013.01); *A01D 69/02* (2013.01); *H02P 1/04* (2013.01); *H02P 1/58* (2013.01)

(58) Field of Classification Search
USPC .............. 318/102, 459; 198/810.01; 180/216; 324/430; 408/1 R; 56/7, 10.2 R, 11.9; 361/695
See application file for complete search history.

(56) References Cited

U.S. PATENT DOCUMENTS

| | | | | |
|---|---|---|---|---|
| 2,060,755 | A | * | 11/1936 | Exner ........................... 318/102 |
| 3,733,794 | A | | 5/1973 | Allen |
| 4,574,943 | A | * | 3/1986 | Green ...................... 198/810.01 |
| 5,343,974 | A | * | 9/1994 | Rabek ........................... 180/216 |
| 6,424,157 | B1 | * | 7/2002 | Gollomp et al. .............. 324/430 |
| 6,531,850 | B1 | | 3/2003 | Griffin et al. |
| 6,745,117 | B1 | | 6/2004 | Thacher et al. |
| 6,946,762 | B2 | | 9/2005 | Rinholm et al. |
| 7,007,446 | B2 | | 3/2006 | Dettmann |
| 7,995,340 | B2 | * | 8/2011 | Peter et al. ..................... 361/695 |
| 2004/0253064 | A1 | * | 12/2004 | Koslowski et al. ........... 408/1 R |
| 2006/0096266 | A1 | | 5/2006 | Dettmann |
| 2007/0209344 | A1 | * | 9/2007 | Berkeley .................... 56/10.2 R |
| 2008/0196371 | A1 | * | 8/2008 | Bryant et al. ......................... 56/7 |
| 2008/0289309 | A1 | * | 11/2008 | Gust et al. ....................... 56/11.9 |
| 2010/0253271 | A1 | * | 10/2010 | Godbold et al. .............. 318/459 |

* cited by examiner

*Primary Examiner* — James Trammell
*Assistant Examiner* — Sanjeev Malhotra

(57) ABSTRACT

A control system is provided for starting electrically powered implements on a vehicle such as a grass mowing machine with electrically powered cutting reels. The electric motors are started at intervals, rather than simultaneously. The intervals between starting each electric motor may be based on pre-defined criteria such as a fixed time constant, voltage, current or speed input from a motor controller for each implement.

6 Claims, 6 Drawing Sheets

CONTROL SYSTEM FOR STARTING ELECTRICALLY POWERED IMPLEMENTS

CROSS REFERENCE TO RELATED APPLICATIONS

This is a continuation of U.S. patent application Ser. No. 12/039,328, entitled CONTROL SYSTEM FOR STARTING ELECTRICALLY POWERED IMPLEMENTS, filed Feb. 28, 2008.

FIELD OF THE INVENTION

This invention relates generally to grass mowing machines, and particularly to starting electrically powered implements such as cutting reels.

BACKGROUND OF THE INVENTION

Grass mowing machines such as fairway mowers, greens mowers, trim mowers and other turf care products are commonly equipped with several powered implements such as cutting reels. In the past, these machines typically have been powered by internal combustion engines, and the cutting reels or other implements were driven by hydraulic motors. Increasingly, traction drives, cutting reels and/or other implements are being powered by electric motors. An example of an electric motor drive for a reel cutting unit is shown in U.S. Pat. No. 6,946,762. For example, a hybrid grass mowing machine may include an internal combustion engine to provide traction drive and turn an alternator or generator, which provides electrical power to electric reel motors that drive the cutting reels. Electric reel motors may include brush-less permanent magnet motors, commutated electric motors, and/or other electric motors, and may be powered directly by an engine driven alternator system, or by an energy storage device or fuel cell.

As an electrically driven implement such as a cutting reel is started, current draw by the electric motor is high compared to the steady state or running current needed to rotate the cutting reel. During start-up, a high torque is required to provide mechanical power to move the cutting reel. The torque must be sufficient to overcome inertia and system losses including electromagnetic losses of the electric reel motor and associated circuitry. As a result, to start turning the cutting reel, electrical power (the product of current and voltage) applied to the electric reel motor must be substantially larger than the steady state power that is needed after start-up. If voltage is held constant, start-up current for an electric reel motor is substantially higher than the steady state current for the motor. For example, start-up current required for an electric reel motor may be as high as 120 Amps DC.

With a typical alternator, particularly a Lundell-type alternator having an output rectifier, if more current is demanded than the alternator can supply, the alternator's output voltage will collapse, yet the current will not correspondingly increase. The alternator's electrical power output does not stay at the maximum available, but drops precipitously.

Efforts have been made to reduce the high start-up current needed for an electric reel motor. For example, U.S. Pat. No. 6,531,850 relates to a motor control for an electrical implement such as a reel mower that provides load control and eliminates high inrush currents and voltage and current transients, so that the electric reel motors can be started smoothly by bringing the voltage up gradually. Additionally, U.S. Pat. No. 7,007,446 relates to a circuit providing a gradual increase in current applied to an electric reel motor, to enable a gradual start-up of the motor.

When starting several electrically powered implements at the same time, however, the current draw is high. For example, start-up current for five electric reel motors may be five times 120 Amps DC. An alternator sufficient to handle the high starting current drawn by five electric reel motors may be oversized to run the motors in steady state.

For the above reasons, it is desired to provide a control system for starting electrically powered implements that reduces peak current demands on an alternator so that the available power will remain close to the alternator's maximum rating. It is desired to provide a control system for starting electrically powered implements that will reduce the current draw required to start up several electrically powered implements such as cutting reels on a grass mowing machine. It is desired to size an alternator for steady state current in an electrical system that starts and operates cutting reels or other implements. An improved control system is needed for starting electrically powered implements.

SUMMARY OF THE INVENTION

A control system is provided for starting electrically powered implements that includes a starting sequence with intervals between starting each implement. The control system may be used on a grass mowing machine with several electrically powered cutting reels. The electric reel motors may be started at intervals, rather than simultaneously. The intervals between starting each electric reel motor may be based on a fixed time constant such as 250 ms, or based on logic that receives an input of voltage, current, or speed from each motor once it has started, and starts the next motor if the input satisfies a pre-defined criteria. The criteria may be constants.

The control system reduces current draw significantly under what is required to start several electrical reel motors simultaneously. With the control system of the present invention, the alternator does not have to be oversized to handle high starting transient current for simultaneously starting multiple implements. The control system also allows the electrical power system to respond to smaller step changes in load, thereby decreasing the dynamic effects of large load changes.

DESCRIPTION OF THE PREFERRED EMBODIMENT

Figure 1:
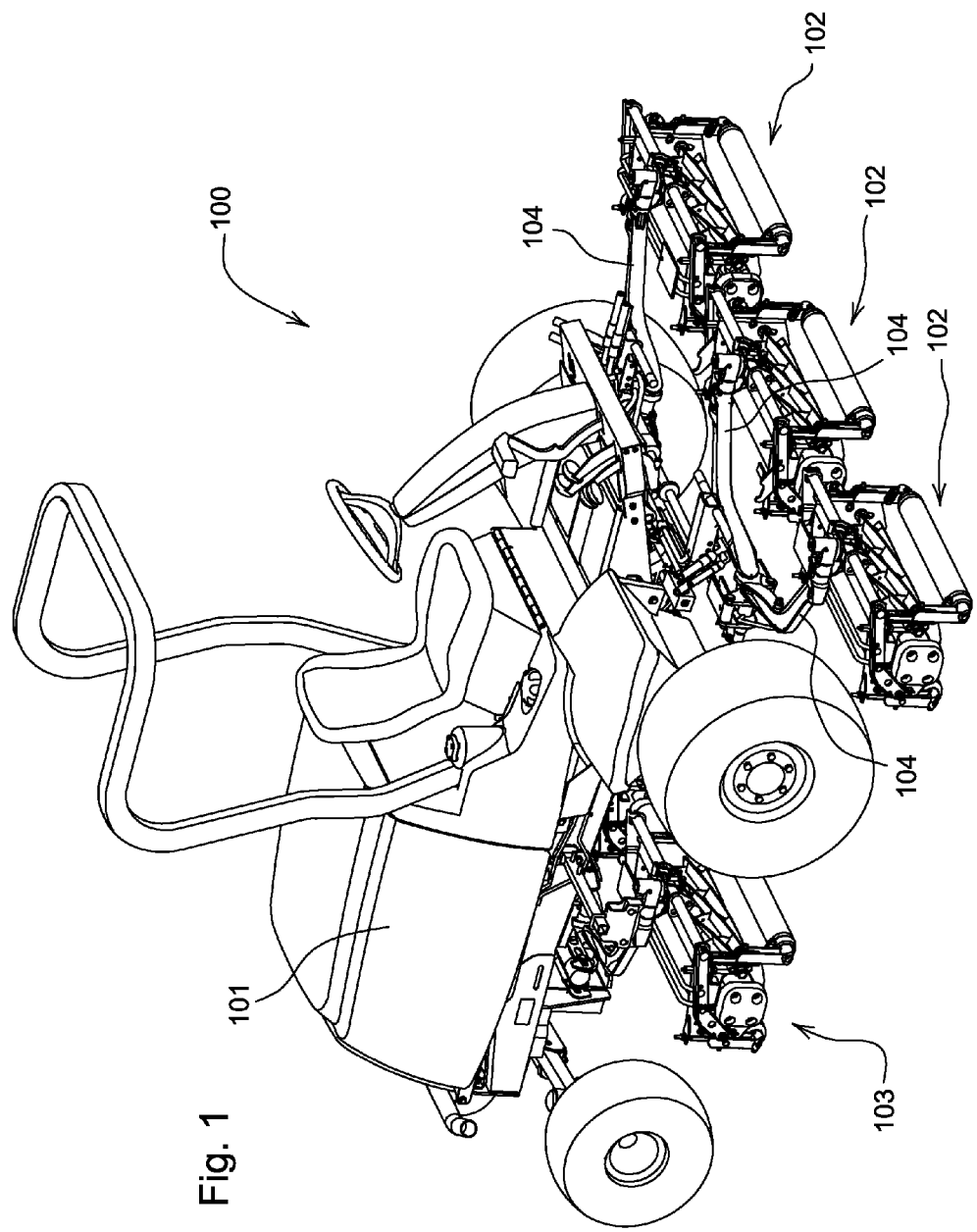
FIG. 1 is a perspective view of a grass mowing machine with a control system for starting electrically powered implements.

In the embodiment shown in FIG. 1, grass mowing machine 100 may be a fairway mower including traction vehicle 101 carrying a first row of three reel-type cutting units 102 and a second row of two reel-type cutting units 103. Alternatively, the grass mowing machine may be a greens mower or any other type of mower having two or more cutting units. Each cutting unit may be connected to the outer end of a lift arm 104. A first or inner end of each lift arm may be pivotably attached to the frame or body of the traction vehicle, and the second or outer end may be pivotably attached to a cutting unit with a knuckle joint to a yoke supporting the cutting unit. The knuckle joint may allow the cutting unit to pivot on a generally vertical axis and/or horizontal axis while it is raised for transport or service, or while it is on the ground surface for mowing. While a cutting unit is on the ground surface, it may be supported with a front roller and a rear roller. The reels may be rotated by electric reel motors.

Figure 2:
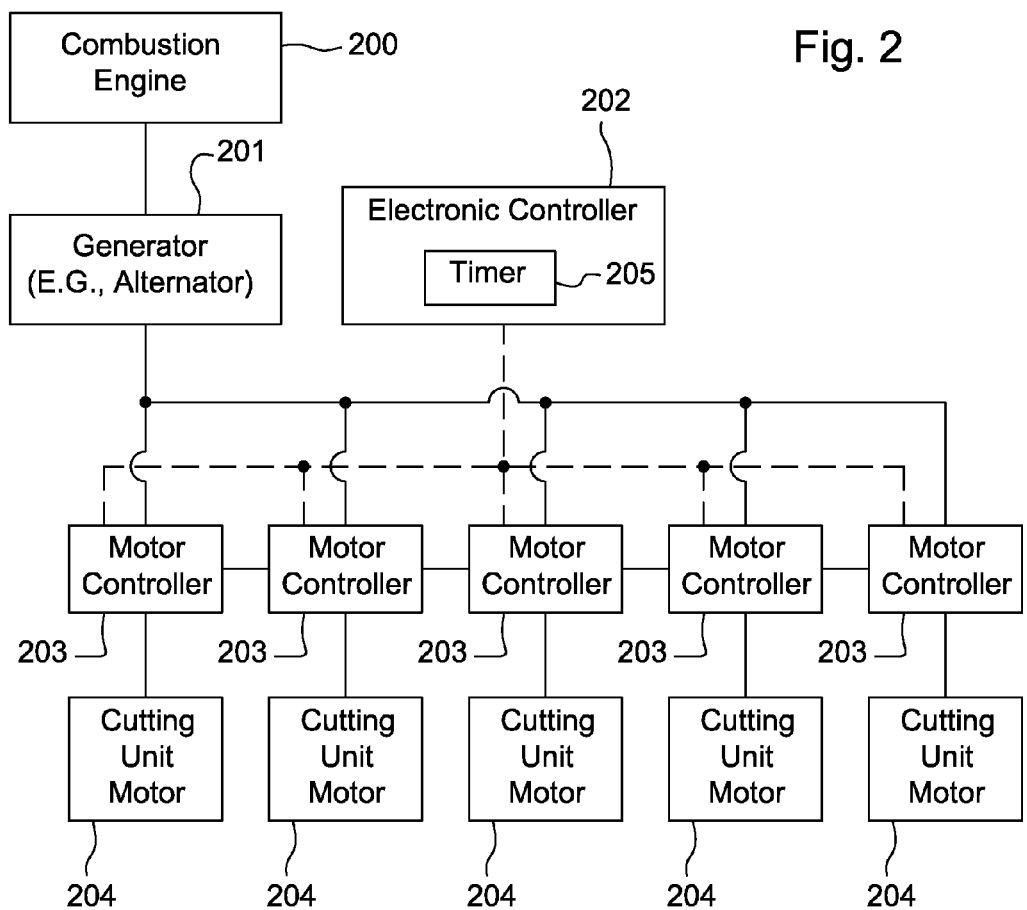
FIG. 2 is a block diagram of a control system for starting electrically powered implements in a first embodiment of the invention.

Now referring to FIG. 2, in one embodiment of the control system for starting electrically powered implements, the grass mowing machine may be a hybrid machine having an internal combustion engine 200 that mechanically drives a generator or alternator 201 through a belt and pulley arrangement. The generator may provide electric power to a plurality of electric cutting reel motors 204 through motor controllers 203 electrically coupled to the generator.

In one embodiment of the control system, electronic controller 202 also is electrically coupled to each motor controller 203. The electronic controller may be a vehicle controller that is provided on-board a grass mowing machine and may implement the control system for starting electrically powered implements. The electronic controller may control the presence, absence or any other aspect of electrical energy to motor controllers 203 and electric reel cutting unit motors 204. The electronic controller may include timer 205 that measures time elapsed after each cutting unit motor is started. The electronic controller may receive input from each motor controller after a motor is started, determine if the input satisfies a pre-defined criteria, and then provide a starting signal to the next motor controller if the input satisfies the pre-defined criteria. For example, the criteria may be a time constant, a voltage constant, a current constant, or a speed constant.

Alternatively, the grass mowing machine may include an energy storage device that provides electrical power to operate the reel motors. The energy storage device may be one or more on-board batteries, dry cells, or other devices for electrochemical storage of electrical energy, or storing or providing electrical energy. The energy storage device may be recharged or replaced periodically when the machine is not operating. Or the grass mowing machine may be powered by a fuel cell with or without an energy storage device.

Figure 3:
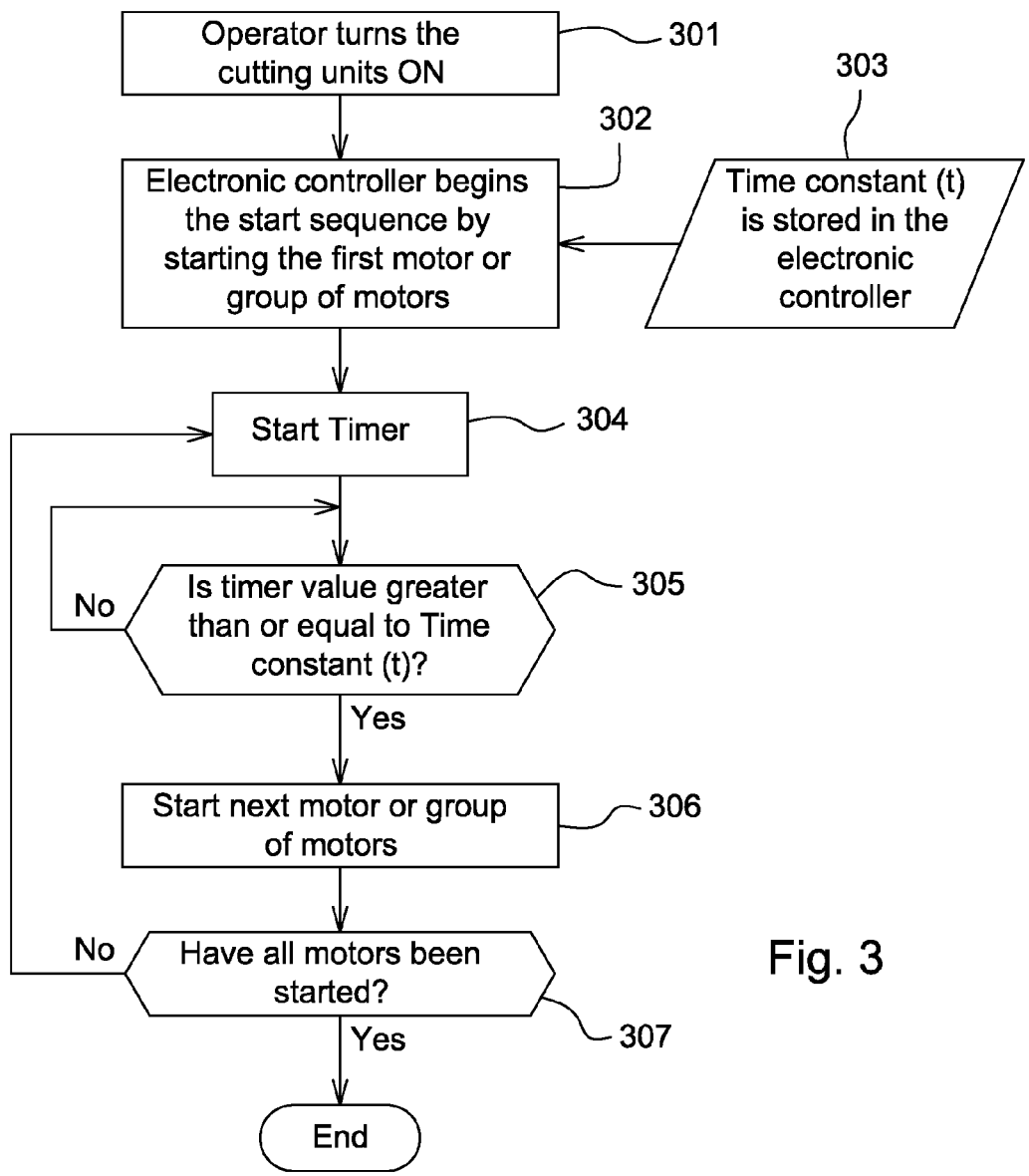
FIG. 3 is a logic diagram of a control system for starting electrically powered implements according to the first embodiment.

As shown in FIG. 3, in a logic diagram for a first embodiment of the control system for starting electrically powered implements, an operator may turn the cutting units on in block 301. In block 302, the electronic controller begins the start sequence by sending a signal to the first motor controller to start the first cutting unit motor. Alternatively, in block 302 the electronic controller may begin the start sequence by sending a signal to a selected group of motor controllers to start several cutting unit motors. In block 303, a pre-defined time constant (t) may be stored in the electronic controller. In block 304, when the start sequence begins, the electronic controller starts a timer. In block 305, the controller checks if the timer value is greater than or equal to time constant (t). If the controller determines that the timer value is less than time constant (t), the controller reads the timer value again at periodic intervals or clock cycles. If the controller determines that the timer value is greater than or equal to time constant (t), in block 306 the controller sends a signal to the next motor controller to start the next cutting unit motor. In the alternative, the controller may send a signal to several motor controllers to start several cutting unit motors. In block 307, the controller determines if all of the cutting unit motors have been started. If not all cutting unit motors have been started, the controller returns to block 304 where the timer is started again. If all cutting unit motors have been started, the starting sequence is completed.

Figure 4:
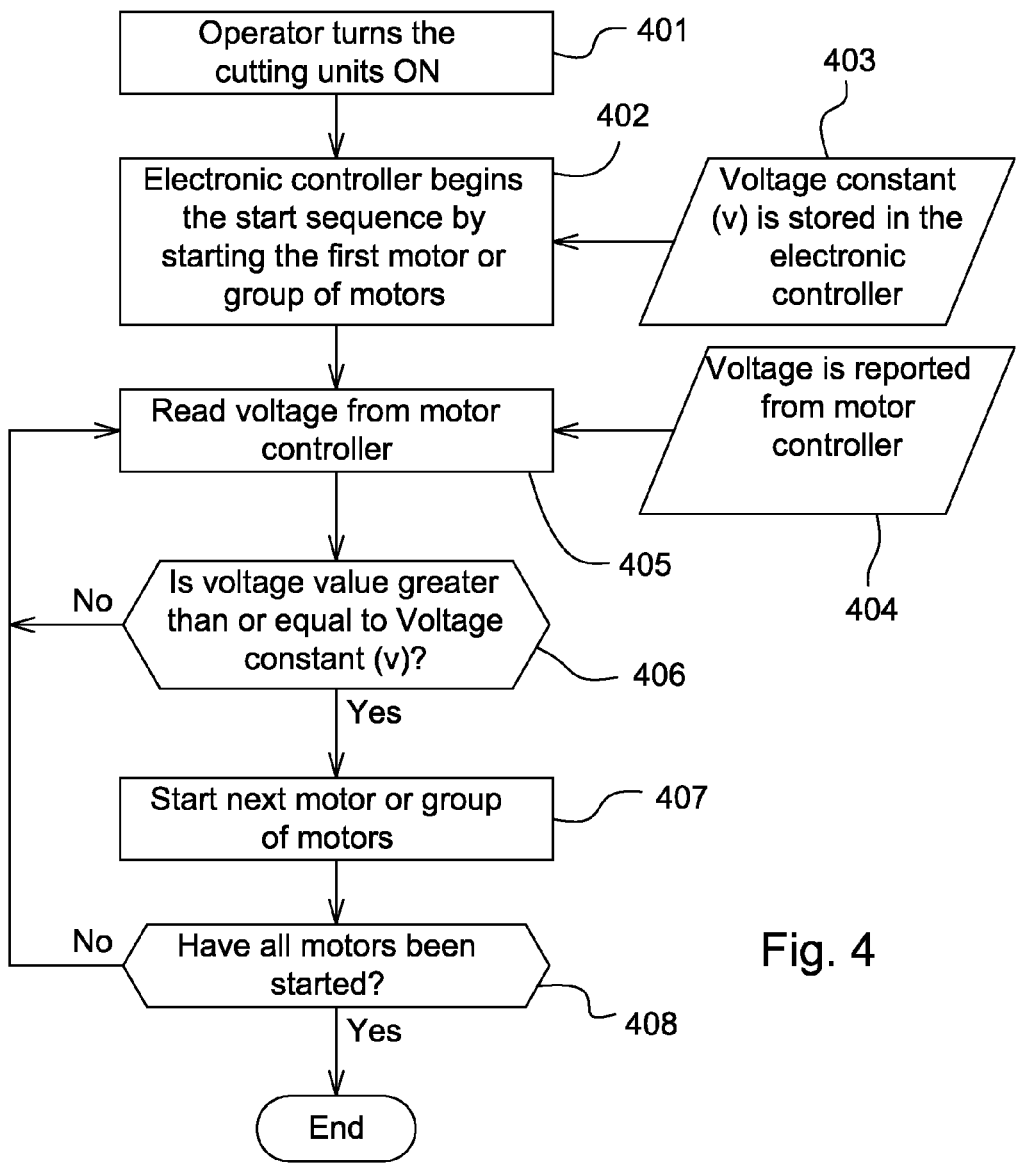
FIG. 4 is a logic diagram of a control system for starting electrically powered implements according to a second embodiment.

In FIG. 4, in a logic diagram for a second embodiment of the control system for starting electrically powered implements, an operator turns the cutting units on in block 401. In block 402, the electronic controller begins the start sequence by sending a signal to a first motor controller to start the first cutting unit motor. Alternatively, in block 402 the electronic controller may begin the start sequence by sending a signal to a selected group of motor controllers to start several cutting unit motors. In block 403, a Voltage constant (v) is stored in the electronic controller. In block 404, a voltage input signal is reported from the motor controller that was just started. Alternatively, voltage input signals may be reported from any one of the motors being started. In block 405, the electronic controller reads the voltage input from the motor controller. In block 406, the electronic controller determines if the voltage input from the motor controller is greater than or equal to the Voltage constant (v). If the controller determines that the voltage input is less than Voltage constant (v), the controller returns to block 405 and reads the voltage value again at periodic intervals or clock cycles. If the controller determines that the voltage input is greater than or equal to Voltage constant (V), in block 407 the controller sends a signal to the next motor controller to start the next cutting unit motor. In the alternative, the controller may send a signal to several motor controllers to start several cutting unit motors. In block 408, the controller determines if all of the cutting unit motors have been started. If not all cutting unit motors have been started, the controller returns to block 405 where the controller reads the voltage from the next motor controller. If all cutting unit motors have been started, the starting sequence is completed.

Figure 5:
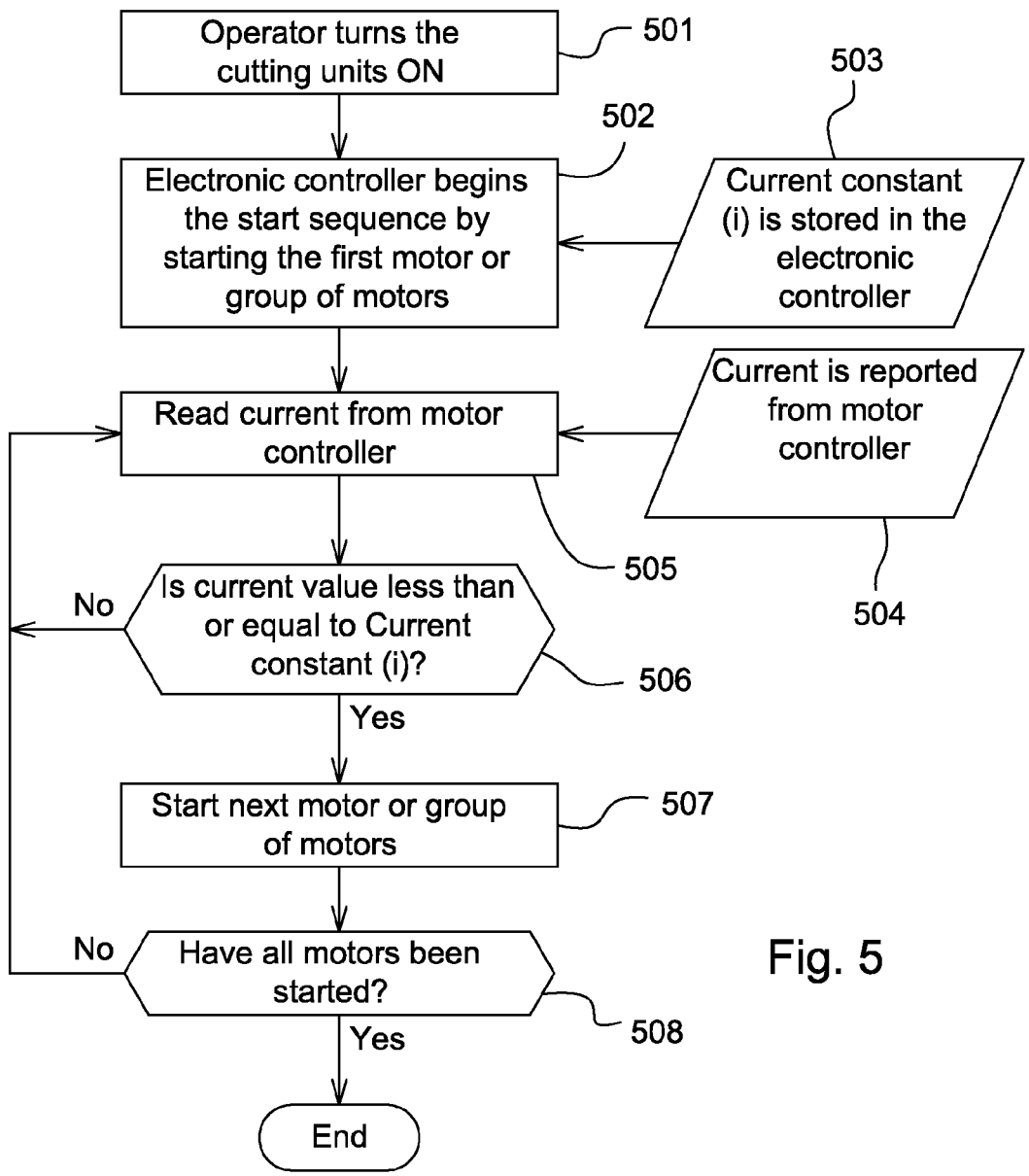
FIG. 5 is a logic diagram of a control system for starting electrically powered implements according to a third embodiment.

FIG. 5 is a logic diagram for a third alternative embodiment of the control system. An operator turns the cutting units on in block 501. In block 502, the electronic controller begins the start sequence by sending a signal to a first motor controller to start the first cutting unit motor. Alternatively, in block 502 the electronic controller may begin the start sequence by sending a signal to a selected group of motor controllers to start several cutting unit motors. In block 503, an Electrical Current constant (i) is stored in the electronic controller. In block 504, a current input signal is reported from the motor controller being started. Alternatively, if more than one motor is being started, a current input signal, the total current input signal, which is the sum of the individual current signals, may be reported. In block 505, the electronic controller reads the current input from the motor controller. In block 506, the electronic controller determines if the current input from the motor controller is greater than or equal to the Current constant (i). If the controller determines that the current input is greater than Current constant (i), the controller returns to block 505 and reads the current value again at periodic intervals or clock cycles. If the controller determines that the current input is less than or equal to Current constant (i), in block 507 the controller sends a signal to the next motor controller to start the next cutting unit motor. In the alternative, the controller may send a signal to several motor controllers to start several cutting unit motors. In block 508, the controller determines if all of the cutting unit motors have been started. If not all cutting unit motors have been started, the controller returns to block 505 where the controller reads the current from the next motor controller. If all cutting unit motors have been started, the starting sequence is completed.

Figure 6:
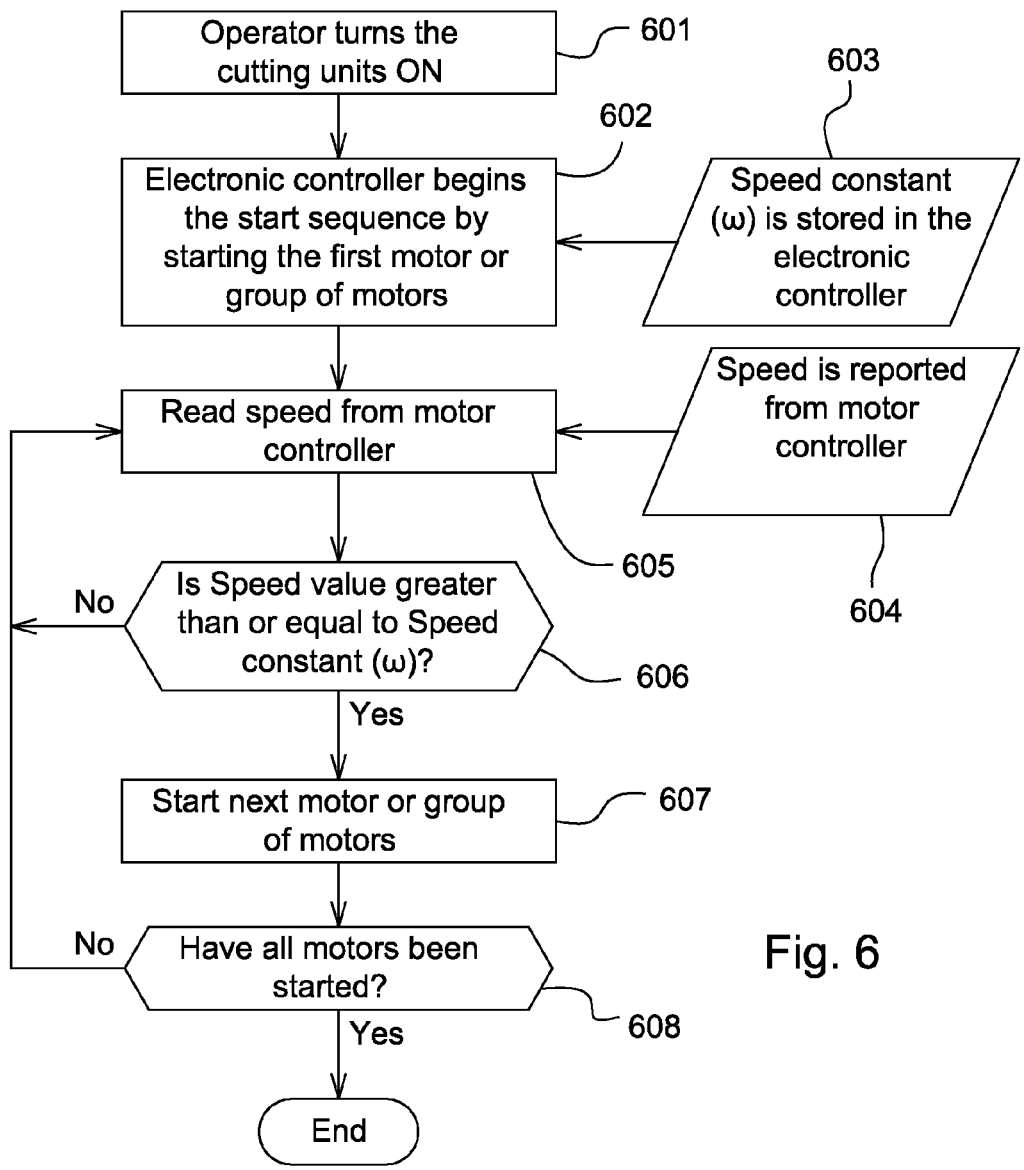
FIG. 6 is a logic diagram of a control system for starting electrically powered implements according to a fourth embodiment.

FIG. 6 is a logic diagram showing a fourth embodiment of the control system for starting electrically powered implements. An operator turns the cutting units on in block 601. In block 602, the electronic controller begins the start sequence by sending a signal to a first motor controller to start the first cutting unit motor. Alternatively, in block 602 the electronic controller may begin the start sequence by sending a signal to a selected group of motor controllers to start several cutting unit motors. In block 603, a Speed constant ($\omega$) is stored in the electronic controller. In block 604, a speed input signal is reported from the last motor controller that was started. In block 605, the electronic controller reads the speed input from the motor controller. In block 606, the electronic controller determines if the speed input from the motor controller is greater than or equal to Speed constant ($\omega$). If the controller determines that the speed input is less than Speed constant ($\omega$), the controller returns to block 605 and reads the speed input again at periodic intervals or clock cycles. If the controller determines that the speed input is greater than or equal to Speed constant ($\omega$), in block 607 the controller sends a signal to the next motor controller to start the next cutting unit motor. In the alternative, the controller may send a signal to several motor controllers to start several cutting unit motors. In block 608, the controller determines if all of the cutting unit motors have been started. If not all cutting unit motors have been started, the controller returns to block 605 where the controller reads the voltage from the next motor controller. If all cutting unit motors have been started, the starting sequence is completed.

Having described a preferred embodiment, it will become apparent that various modifications can be made without departing from the scope of the invention as defined in the accompanying claims.

The invention claimed is:

1. A control system for starting a plurality of electrically powered grass cutting implements on a vehicle, comprising:
an electronic controller providing a starting signal to a first motor controller for a first grass cutting implement, reading an input from the first motor controller, providing a starting signal to a second motor controller for a second grass cutting implement if the input from the first motor controller is greater than or equal to a pre-defined constant stored in the electronic controller, continuing to read the input from the first motor controller at periodic intervals if the input is less than the pre-defined constant, reading an input from the second motor controller, and providing a starting signal to a third motor controller for a third grass cutting implement if the input from the second motor controller is greater than or equal to the pre-defined constant, and continuing to read the input from the second motor controller at periodic intervals if the input is less than the pre-defined constant.

2. The control system of claim 1, wherein the pre-defined constant is a time constant.

3. The control system of claim 1, wherein the pre-defined constant is a voltage constant.

4. The control system of claim 1, wherein the pre-defined constant is a current constant.

5. The control system of claim 1, wherein the pre-defined constant is a speed constant.

6. The control system of claim 1, wherein the electrically powered grass cutting implements are cutting reels.

* * * * *